(12) United States Patent
Bartha et al.

(10) Patent No.: US 6,753,283 B2
(45) Date of Patent: Jun. 22, 2004

(54) SYNTHETIC, REFRACTORY MATERIAL FOR REFRACTORY PRODUCTS, AND PROCESS FOR PRODUCING THE PRODUCT

(75) Inventors: Peter Bartha, Bovenden (DE); Hans-Jurgen Klischat, Gleichen (DE); Holger Wirsing, Goettingen (DE); Guido Weibel, Scheden (DE)

(73) Assignee: Refratechnik Holding GmbH, Ismaning (DE)

( * ) Notice: Subject to any disclaimer, the term of this patent is extended or adjusted under 35 U.S.C. 154(b) by 0 days.

(21) Appl. No.: 10/115,574

(22) Filed: Apr. 3, 2002

(65) Prior Publication Data

US 2003/0064880 A1 Apr. 3, 2003

(30) Foreign Application Priority Data

Apr. 5, 2001 (DE) .......................................... 101 17 029

(51) Int. Cl.$^7$ ........................ C04B 35/44; C04B 35/443
(52) U.S. Cl. ........................ 501/112; 501/115; 501/120
(58) Field of Search ................................. 501/112, 115, 501/120, 83

(56) References Cited

U.S. PATENT DOCUMENTS

| | | | | |
|---|---|---|---|---|
| 5,135,896 A | * | 8/1992 | Vezza .......................... | 501/120 |
| 5,569,631 A | * | 10/1996 | Harmuth et al. ............. | 501/112 |
| 5,573,987 A | * | 11/1996 | Harmuth et al. ............. | 501/108 |
| 5,723,394 A | * | 3/1998 | Harmuth et al. ............. | 501/112 |
| 6,261,983 B1 | * | 7/2001 | Gruver ....................... | 501/120 |
| 6,482,760 B1 | * | 11/2002 | Buchebner et al. ......... | 501/120 |

* cited by examiner

Primary Examiner—Karl Group
(74) Attorney, Agent, or Firm—Goodman & Teitelbaum, Esqs.

(57) ABSTRACT

A material for refractory shaped bodies or compounds, the material being a pleonaste and/or a spinel of the pleonaste type. In addition to $FeO_x$ and $Al_2O_3$, the material also includes MgO. The ratio of the iron in the material is calculated as $Fe_2O_3:Al_2O_3$, and ranges from 30:70 to 50:40. The material contains from 20 to 60% by mass of MgO, as based on $Fe_2O_3+Al_2O_3$.

4 Claims, 1 Drawing Sheet

$MgO-FeO_x-Al_2O_3$ system

MgO–FeO$_x$–Al$_2$O$_3$ system

SYNTHETIC, REFRACTORY MATERIAL FOR REFRACTORY PRODUCTS, AND PROCESS FOR PRODUCING THE PRODUCT

BACKGROUND OF THE INVENTION

The invention relates to a synthetic, refractory material for refractory products.

In the text which follows, the term resistor denotes a material which is the main component of a refractory product. In the most general situation, this resistor may be a metal-oxide, mineral, refractory material, such as MgO, $Al_2O_3$, doloma or the like.

In the text which follows, the term elasticizers denotes mineral, elasticizing materials which have a relatively high refractory quality and, on account of a thermal expansion which differs from that of the resistor and on account of the resultant microstructural defects, such as for example microcracks, in particular along the grain boundaries, and further effects lead to an increase in the thermal shock resistance of a mixture of resistor and elasticizer, compared to the pure resistor.

Refractory products, in particular basic refractory products based on magnesia, doloma, chromite and/or spinel ($MgAl_2O_4$) are used in all high-temperature processes with basic slag attack, such as for example in the production of cement, lime, dolomite, iron and steel and for the production of nonferrous metals and in the glass industry as lining material for furnaces, vessels and treatment units. However, if they have a high refractory quality and good chemical resistance, these materials or shaped bodies are highly brittle, i.e. have a high modulus of elasticity, resulting in adverse effects on the service life with regard to thermal expansion, stresses, mechanical loads and thermal shock resistance (TSR).

Furthermore, it is known for refractory shaped bodies also to be produced on the basis of $Al_2O_3$, in which case the raw material used is in particular bauxite, tabular alumina or fused corundum. Principal application areas for bricks of this type are electric furnace covers and ladles used in the steelmaking industry and cement kilns and the furnaces used in the glass industry.

It is known to reduce the high thermal expansion stresses of basic refractory products or shaped bodies by laying the refractory bricks with mortar joints, metallic inserts, such as metal sheets, perforated metal sheets or meshes, arranged between them.

Furthermore, numerous measures have been taken in the past to improve the thermal shock resistance, in particular even of basic refractory materials. It is known from Harders/Kienow, Feuerfestkunde, Herstellung, Eigenschaften und Verwendung feuerfester Baustoffe [Refractory technology, production, properties and use of refractory construction materials], Springer Verlag 1960, Chapter 5.5, pages 754 and 755, to considerably improve the thermal shock resistance by adding chrome ore (chrome magnesia brick) and by means of what is known as a miscibility gap, i.e. minimizing the mean grain size fraction (0.2 to 0.6 mm). However, a major drawback of the miscibility gap is, on the one hand, that its effect is only sufficiently high in combination with a TSR component, such as for example magnesia in chrome magnesia bricks or chrome ore in magnesia chrome bricks, if, on the other hand, when using the miscibility gap it is also impossible to achieve an optimum grain packing density as is desired in order to achieve a high resistance to infiltration with respect to slags. Furthermore, with regard to the addition of chrome ore (e.g. Harders/Kienow, page 754), the quantity of chrome ore and the optimum grain size fraction of the chrome ore have been defined. To achieve a sufficient TSR, quantities of chrome ore of between 15 and 30% by weight have been recognized to be suitable. The elasticizing action of the chrome ore in shaped bodies based on magnesia was hitherto unequalled. However, decisive drawbacks of the use of chrome ore as an elasticizer (TSR component) are that material fatigue occurs when the kiln or furnace atmosphere changes, and that the chromium oxide, which is present in trivalent form in the chrome ore, is converted by oxidation under the action of alkalis into toxic hexavalent chromium oxide, with all the associated problems in terms of safety at work and disposal.

It is known from Austrian patent AT 158208 to add alumina powder, corundum and aluminum powder to magnesia bricks in order to improve the TSR, spinel (MgO—$Al_2O_3$) being formed in situ during brick firing. The spinel formed is concentrated in the matrix material, which surrounds the resistor grains, and is in some cases not fully reacted, so that in the event of such bricks being attacked by slags, the matrix, which is of crucial importance for the strength, is preferentially destroyed. Furthermore, the improvement in TSR which can be achieved is limited, since the proportion of $Al_2O_3$ required to achieve a decisive improvement would have to be well over 8% by weight. On account of the excessive growth of the bricks as a result of an increase in volume in the matrix, however, this is impossible, since otherwise the dimensional accuracy and mechanical strength become insufficient and the porosity becomes excessive.

It has been possible to considerably improve both the TSR and the chemicals resistance of magnesia bricks by adding pre-synthesized magnesium-aluminum spinel in the form of sintered or fused spinel, the quantities added usually being between 15 and 25% by weight.

Furthermore, DE 44 03 869 C1 has disclosed a refractory ceramic batch which, as carrier of the refractory quality, substantially contains sintered MgO, with a spinel of the hercynite type being used as elasticizer. However, its resistance to basic slags is inadequate.

BRIEF SUMMARY OF THE INVENTION

It is an object of the invention to provide a synthetic, refractory material for a refractory product which reliably elasticizes the product and has a high corrosion resistance in particular with respect to basic compounds.

The object is achieved by a material having the features set forth below.

It is a further objet of the invention to provide a process for producing a product using the material.

This object is achieved by a process having the features set forth below.

Advantageous refinements are characterized below.

BRIEF DESCRIPTION OF THE SEVERAL VIEWS OF THE DRAWINGS

The invention is explained by way of example with reference to a single drawing, in which.

DETAILED DESCRIPTION OF THE INVENTION

Figure 1:
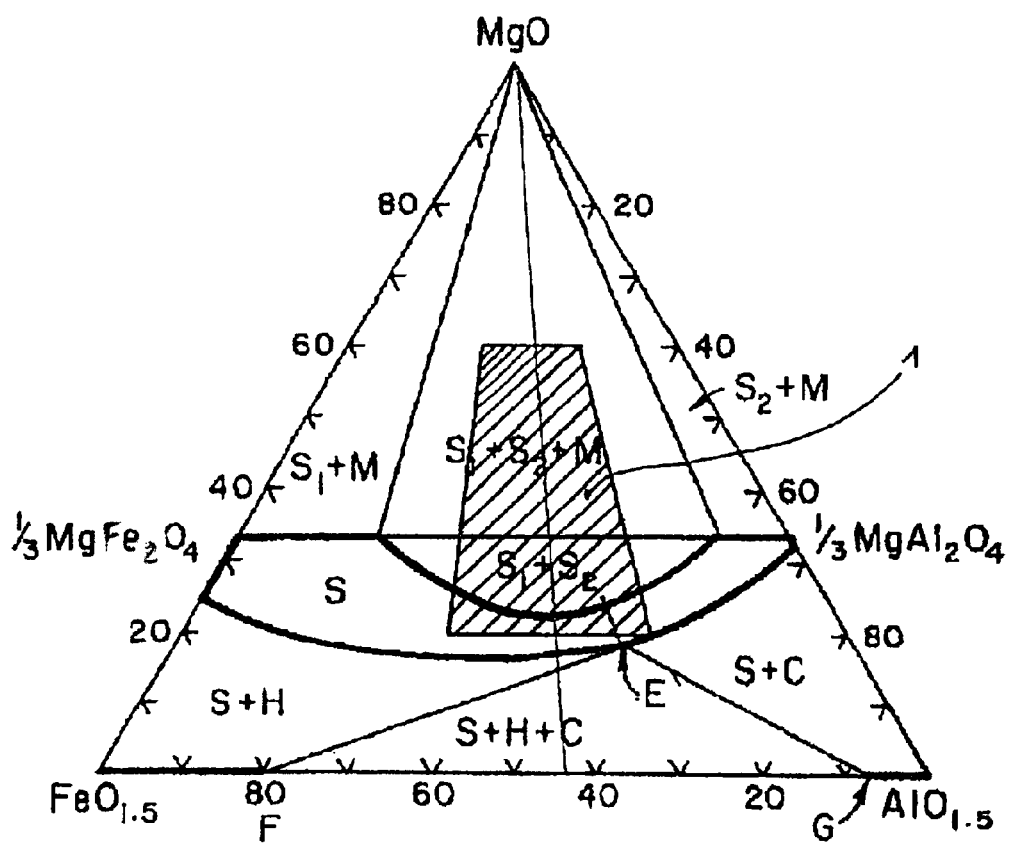
FIG. 1 shows the ternary system $FeO_x$, $Al_2O_3$, MgO, with the composition field 1 of the material according to the invention of the pleonaste type being illustrated in hatched form in the ternary system.

The material of the pleonaste type according to the invention, given an MgO content of 20 to 50%, has an $Al_2O_3$—$FeO_x$ ratio of 70:30 to 40:60. The material according to the invention used is in particular even pleonaste itself. According to Matthes, S., Mineralogie [Mineralogy], Springer Verlag, Berlin Heidelberg New York Tokyo 1983, p. 68, pleonaste is a solid solution of the composition (Mg, $Fe^{2+}$) (Al, $Fe^{3+}$)$_2O_4$.

Surprisingly, it has been found that the pleonastic material or material of the pleonaste type according to the invention, in particular pleonaste itself and in particular in the case of refractory shaped bodies which contain MgO as resistor, given a high elasticizing of the MgO, results in a significant improvement to the corrosion behavior of a product produced from MgO and pleonaste. On account of the MgO content of the pleonaste of 20 to 50% MgO, pleonaste is chemically and mineralogically close to the resistor MgO. Usually, a mineralogical and chemical closeness of this nature between the material which acts as the elasticizer and the resistor reduces the elasticizing, since, in particular, the thermal expansion of the resistor and of the elasticizer are similar. In the material according to the invention pleonaste or material of the pleonaste type, the elasticizing action of the material is surprisingly not reduced compared to a pure $FeO_x/Al_2O_3$ spinel. However, compared to materials which do not contain MgO, it is possible to obtain a very much higher chemicals resistance, in particular corrosion resistance with respect to basic, in particular calcium silicate compounds, which cannot be achieved with comparable $FeO_x/Al_2O_3$ spinels.

The increased thermochemical resistance can be proved by means of a heating microscope. To obtain practically relevant results with regard to the corrosion behavior, substrates were produced from hercynite ($FeAl_2O_4$) and the material of the pleonaste type, which contained 20, 35 and 50% of MgO. The pleonaste material is produced by melting in an arc furnace at a temperature of approx. 2000° C., the pleonastic material being produced from the respective oxide raw materials aluminum oxide, iron oxide and magnesium oxide. The starting substances used were in particular alumina, magnetite and caustic magnesia. After cooling, substrates with dimensions of 10×10×3 mm were cut from the pleonastic material, and their behavior with respect to calcium silicate compounds was examined. Various cement clinkers, namely Portland cement clinker, white cement clinker and clinker of a sulfate-resistant cement, were used as reference substance for calcium silicate compounds, which can also occur in the steel industry as slags.

A shaped cylindrical specimen with a height of 3 mm and a diameter of 3 mm, respectively comprising Portland cement clinker, white cement clinker or clinker of a sulfate-resistant cement, is placed onto the substrates and introduced into the heating microscope. This is heated until the substrate is corroded by the cement clinker. The corrosion temperature corresponds to the first occurrence of a reaction or melting in the boundary between substrate and cement clinker. The corresponding values are given in the table below:

TABLE 1

Dependency of the corrosion temperature of hercynite or pleonaste on the MgO content

|  | Sulfate-resistant cement | Portland cement | White cement |
|---|---|---|---|
| Hercynite (0% MgO) | 1370° C. | 1305° C. | 1360° C. |
| Pleonaste (20% MgO) | 1405° C. | 1350° C. | 1400° C. |
| Pleonaste (35% MgO) | 1420° C. | 1380° C. | 1415° C. |
| Pleonaste (50% MgO) | 1470° C. | 1400° C. | 1450° C. |

It can be seen from the table that, as the MgO content in the pleonaste material increases, the corrosion temperature rises drastically and it is possible to reach values which are up to around 100° C. higher than the corrosion temperature when using hercynite. Since the corrosion temperature of the pleonaste material rises as the MgO content increases, a shaped body which contains the material of this type is also considerably more resistant to corrosion than a shaped body which contains hercynite.

The elasticizing action of the corrosion-resistant material according to the invention is explained on the basis of the following example:

Magnesia with a maximum grain size of 4 mm and a grain size distribution corresponding to a typical Fuller curve is mixed with 15% of pleonaste and then with the required quantity of lignin sulfate as temporary binder. Then, the batch obtained in this way is compressed under a specific pressure of 130 MPa. After drying, the shaped body is fired at a sintering temperature of 1450° C.

The properties achieved are listed in the following Table 2.

TABLE 2

|  | Magnesia brick | Magnesia chromite brick | Magnesia spinel brick | Magnesia pleonaste (with 20% of MgO in the pleonaste) | Magnesia pleonaste (with 35% of MgO in the pleonaste) | Magnesia pleonaste (with 50% of MgO in the pleonaste) |
|---|---|---|---|---|---|---|
| Apparent density g/cm | 2.93 | 2.94 | 2.92 | 2.93 | 2.91 | 2.92 |
| Porosity | 16.7 | 16.8 | 16.6 | 17.1 | 17.4 | 16.9 |
| Modulus of elas- | 81.6 | 27.4 | 25.3 | 25.1 | 26.8 | 28.6 |

TABLE 2-continued

|  | Magnesia brick | Magnesia chromite brick | Magnesia spinel brick | Magnesia pleonaste (with 20% of MgO in the pleonaste) | Magnesia pleonaste (with 35% of MgO in the pleonaste) | Magnesia pleonaste (with 50% of MgO in the pleonaste) |
|---|---|---|---|---|---|---|
| ticity GPa |  |  |  |  |  |  |
| Cold compression strength MPa | 83.0 | 72.3 | 68.1 | 69.5 | 60.6 | 75.4 |
| TSR | 8 | >100 | >100 | >100 | >100 | 100 |
| DE: T0 ° C. | 1600 | 1550 | 1504 | 1504 | 1510 | 1551 |

In the table, a comparative brick comprising magnesia which does not contain any material according to the invention, a magnesia chromite brick, which contains chrome ore as elasticizer, and a magnesia spinel brick, which contains magnesia aluminum spinel as elasticizer, are compared with magnesia pleonaste shaped bodies according to the invention, the pleonaste material according to the invention containing 20, 35 and 50% of MgO. The To value is determined in accordance with DIN 51 053, Part 1, and is the temperature at which the maximum expansion $D_{max}$ occurs. Accordingly, this is the temperature of the maximum of the height change/temperature curve given in FIG. 1 of DIN 51 053.

Compared to the magnesia brick, it can be seen that the modulus of elasticity can be very effectively reduced, by adding the material according to the invention, into a range which corresponds to that of the magnesia chromite brick. When using a pleonaste containing 20% by MgO, the values are even slightly better than when using a magnesia spinel brick. It is notable that, at a very high cold compression strength of 75 MPa in a magnesia pleonaste brick containing 50% of MgO in the pleonaste material, it is possible to achieve a high thermal shock resistance in combination with a relatively low modulus of elasticity. Furthermore, with a magnesia pleonaste brick of this type, it is possible to achieve a good To value in the softening-under-load test, while at the same time the very high corrosion resistance which has already been presented in Table 1 is achieved.

Naturally, the moduli of elasticity of the shaped bodies can be varied within different limits which are matched to the particular requirements by varying the addition of the pleonaste material or pleonastic material according to the invention. Furthermore, it is possible to add pleonaste to sintered magnesia of varying provenance. Furthermore, the inventive elasticizer pleonaste can also be used to elasticize fused magnesia or shaped bodies with completely different resistors.

Furthermore, the material can be used as elasticizer in the form of a mix comprising the pleonastic material and other known elasticizers, in particular magnesium-aluminum spinel.

In the material according to the invention and products produced therefrom, it is advantageous that, given the same elasticizing capacity as that achieved with conventional elasticizers, a considerably greater corrosion resistance, in particular with respect to basic slags, is achieved. A further advantage is that, in particular resistors based on periclase (MgO) are not attacked by the inventive pleonastic material by diffusion in the microstructure in the way which occurs, for example, when hercynite is used.

What is claimed is:

1. A material for refractory shaped bodies or compounds, comprising:

the material being a pleonaste and/or a spinel of a pleonaste type, the material including $FeO_X$ and $Al_2O_3$, and additionally including MgO to provide a resistor in the material so that $t_1$ thermal shock resistance of the material is increased, a ratio of iron in the material being calculated as $Fe_2O_3:Al_2O_3$ and ranging from 30:70 to 60:40, and the material containing from 20 to 60% by mass of MgO, as based on $Fe_2O_3+Al2O_3$.

2. The material as claimed in claim 1, wherein the material is a fused, synthetic spinel formed from raw materials of magnesia, alumina and iron compounds including iron oxide as a magnetite of the pleonaste type.

3. The material as claimed in claim 1, wherein the spinet of the pleonaste type is synthetic and defines an elasticizer, the elasticizer being sintered from raw materials of magnesia, alumina and magnetite.

4. The material as claimed in claim 1, wherein, in order to control corrosion temperature, the material has a high MgO content ranging within predetermined limits, relative to the $Fe_2O_3$ and $Al_2O_3$.

* * * * *